J. H. EBERT & E. PITTS.
Apparatus for Steaming Grain.
No. 142,008. Patented August 19, 1873.
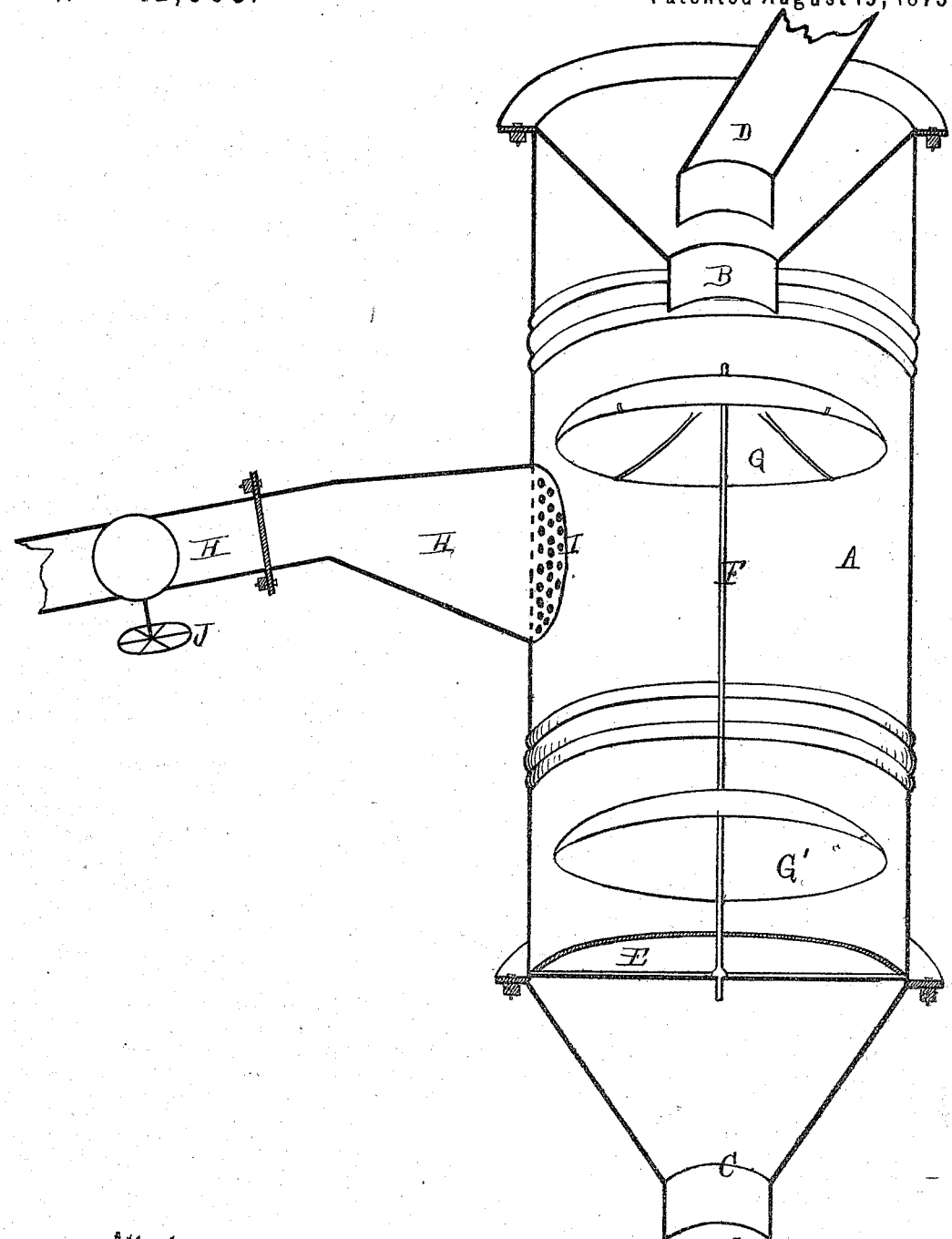
Attest
H. Sprague
Theo. S. Day
Inventor
J. H. Ebert
Ezekiel Pitts
By Atty
Thos. S. Sprague

UNITED STATES PATENT OFFICE.

JOHN H. EBERT AND EZEKIEL PITTS, OF DECATUR, ILLINOIS.

IMPROVEMENT IN APPARATUS FOR STEAMING GRAIN.

Specification forming part of Letters Patent No. 142,008, dated August 19, 1873; application filed March 18, 1873.

*To all whom it may concern:*

Be it known that we, JOHN H. EBERT and EZEKIEL PITTS, of Decatur, in the county of Macon and State of Illinois, have invented a new and useful Improvement in Wheat-Steamers; and we do declare that the following is a true and accurate description thereof, reference being had to the accompanying drawings and to the letters of reference marked thereon and being a part of this specification, in which our steamer is shown in a sectional perspective view.

The object of this invention is to provide a device by means of which wheat may be dampened by steam just before it passes to the stones, especially if it be dry and dusty, whereby the bran is partially agglutenized and does not grind so fine as when the wheat is dry, thereby enabling the miller to grind closer and yet make a whiter flour and about one pound more of it to the bushel of wheat. The invention consists in the peculiar construction of a chamber into which the wheat is discharged and through which it passes to the stones, being subjected in its passage to numerous jets of live steam, which heat and dampen it in its passage, the volume of the steam being regulated by a valve, as more fully hereinafter set forth.

In the drawing, A represents a metallic cylinder provided with a receiving-tunnel, B, at the top and a discharging-tunnel, C, at the bottom. D is a spout which discharges wheat into the cylinder, from the lower end of which it passes directly to the stones. E is a bar across the lower part of the cylinder, from which rises a fixed vertical shaft, F, which supports an inverted cup-shaped deflector, G, at the top, and another, G', near the bottom. The grain entering the cylinder at the top falls on the upper cup, which deflects it and spreads it toward the walls of the cylinder, while the lower again spreads it should it gather toward the center under the action of the steam-jets. H is a steam-pipe entering the side of the cylinder just below the upper cup, and is provided with a rose, I, which divides the inflowing steam into numerous jets, while it also serves as a strainer to prevent grain from getting into the steam-pipe. J is a globe-valve to regulate the volume of steam blown into the cylinder. The upper cup, if of thin metal, may be strengthened by wire-ribs on the under side, as shown.

The mouths of the receiving and discharging tunnels being proportioned to the feed of the stones the wheat virtually fills them in its passage through them, and thus prevents the escape of steam, which is absorbed by the grain. This softens and toughens the cortical of the berry without affecting the farinaceous body thereof, which prevents the bran from breaking into minute particles to speck and darken the flour. Besides this less power is required to grind the grain, and more flour of a better quality is obtained from a given quantity of wheat.

What we claim as our invention, and desire to secure by Letters Patent, is—

The device for steaming and dampening wheat, consisting of the cylinder A provided with the tunnels B C, bar E, shaft F, deflectors G G', steam-pipe H, rose I, and valve J, constructed, arranged, and operating substantially as shown and set forth.

JOHN HENRY EBERT.
EZEKIEL PITTS.

Witnesses:
JOHN E. KINNEY,
JACKSON FISHER.